United States Patent
Abplanalp et al.

[11] Patent Number: 5,906,046
[45] Date of Patent: May 25, 1999

[54] AEROSOL TILT VALVE AND METHOD OF FORMING SAME

[75] Inventors: Robert H. Abplanalp, Bronxville, N.Y.; Louis Pericard, Hattersheim; Gunter Kolanus, Niedernhausen, both of Germany

[73] Assignee: Precision Valve Corporation, Yonkers, N.Y.

[21] Appl. No.: 08/903,638

[22] Filed: Jul. 31, 1997

[51] Int. Cl.⁶ .................................................. B23P 15/00
[52] U.S. Cl. .................................. 29/890.124; 29/890.127
[58] Field of Search ...................... 29/890.124, 890.127, 29/428; 220/402.21

[56] References Cited

U.S. PATENT DOCUMENTS

| | | | |
|---|---|---|---|
| 3,901,410 | 8/1975 | Schultz | 222/153 |
| 3,920,165 | 11/1975 | Schultz | 222/402.22 |
| 4,234,108 | 11/1980 | Diamond | 222/386 |
| 4,444,339 | 4/1984 | Beard | 222/402.22 |
| 4,450,984 | 5/1984 | Beard | 222/402.22 |
| 4,472,943 | 9/1984 | Grabill | 60/585 |
| 4,800,948 | 1/1989 | Visnic | 29/890.127 |
| 4,916,789 | 4/1990 | Robinson | 29/890.127 |
| 5,320,255 | 6/1994 | Stoffel et al. | 222/212 |
| 5,340,031 | 8/1994 | Neuhans et al. | 239/343 |

*Primary Examiner*—I Cuda
*Attorney, Agent, or Firm*—Kilgannon & Steidl

[57] ABSTRACT

An aerosol tilt valve has an integrated molded hollow stem shaft and molded conical stem cup. An upper outer circumferential edge of the stem cup normally fully seals, except when the valve is tilted, against a gasket surrounding the stem shaft. The outer lower wall of the stem shaft and the inner wall of the stem cup define an annular space. At least one molded metering orifice below the upper edge of the stem cup extends from the annular space through the stem shaft. The stem shaft is molded with a molded annular recess about the lower shaft end and with the at least one molded metering orifice. The molded stem shaft is inserted in a mold cavity. A lower portion of an annular shield blocks the metering orifice, and together with the mold cavity and lower part of the stem shaft, defines the stem cup shape. The stem cup is molded having an annular projection extending into the annular recess to form a strong and fully integrated stem cup and stem shaft functioning essentially as one piece. The lower portion of the shield also defines the annular space.

3 Claims, 4 Drawing Sheets

5,906,046

AEROSOL TILT VALVE AND METHOD OF FORMING SAME

FIELD OF THE INVENTION

The present invention relates to valves to dispense products from pressurized containers, and more particularly to aerosol tilt valves operated by angularly tilting the tilt valve stem by finger pressure on the portion of the stem shaft extending above the aerosol mounting cup.

BACKGROUND OF THE INVENTION

In a known construction of an aerosol tilt valve assembly, a hollow stem discharge shaft is mounted in a resiliently deformable sealing gasket at the top of the container, the stem shaft extending both outwardly from and inwardly into the container through the gasket. The portion of the stem discharge shaft extending outwardly from the container has an axial or lateral outlet, and the portion of the stem shaft extending into the container has at least one lateral inlet metering orifice. When the valve is actuated by tilting, product flows from the container into the lateral inlet orifice, up the hollow stem shaft, and out the axial or lateral outlet.

Further in this known construction, the tilt valve has a substantially conical stem cup provided under the sealing gasket having an outer circumferential edge that normally fully engages the under surface of the sealing gasket inside the container. The cup and the sealing gasket define an annular space surrounding the stem shaft, which space is connected to the hollow interior of the stem shaft by the lateral inlet metering orifice. The stem cup, by virtue of its outer circumferential edge normally engaging the under surface of the sealing gasket, usually prevents product flow from the aerosol container into the aforesaid annular space and into the stem shaft inlet orifice. However, when finger pressure is applied to the stem shaft extending above the mounting cup, the outer circumferential edge of the stem cup is partly disengaged from the surface of the sealing gasket. Product from the container (under the action of propellant) then flows between the disengaged outer circumferential cup edge and the gasket into the aforesaid annular space, then through the inlet metering orifice, up the stem shaft, and is dispensed from the stem shaft outlet. When the finger pressure is removed from the stem shaft, the outer circumferential edge of the stem cup again fully engages the sealing gasket. The aforesaid annular space and inlet orifice are then cut off from the product in the container. In such known construction, a spring also is used to bias the stem cup, particularly its outer circumferential edge, against the sealing gasket.

One of the difficulties of the above-described known construction is that the lateral inlet metering orifice is very difficult to form if the stem shaft and stem cup are of one-piece construction. To be effective, that orifice must be fully within the annular space surrounding the stem shaft and defined by the sealing gasket and stem cup. In other words, the metering orifice must lie below the sealing gasket and the top of the stem cup. In order to conventionally form the inlet orifice, a special tool has been inserted down the top of the hollow stem shaft to punch out the metering orifice from inside the shaft; or a special tool has been inserted through the bottom of the stem during molding to form the metering orifice, the bottom of the stem thereafter being closed. Alternatively, because of the limited space between the cup wall and the stem shaft, a drill had been extended at an angle over the circumferential edge of the stem cup to drill a downwardly extending angled inlet orifice into the stem shaft. All of these operations for forming the metering orifice are less than satisfactory for reasons of complexity and/or controllability of the metering orifice.

It is likewise desirable in tilt valve assemblies of the above general construction to have the stem shaft and stem cup in fixed position with one another for lateral and vertical stability and controllability of the tilt valve operation. The shaft and cup may be made of one piece, in which event there are the aforementioned difficulties in connection with forming the inlet metering orifice. However, if the shaft and stem cup are formed in two separate pieces, subsequently connected together, a permanent assembly operation to prevent disassembly on operation is required in which the two parts must be carefully positioned with respect to each other and locked together to prevent significant movement with respect to each other when the tilt valve is operated. This is difficult to obtain in practice, however. When the stem shaft and stem cup are separately molded of a desirable material such as nylon, which is hygroscopic, and subsequently assembled, the swelling of the assembled parts in their environment may result in disassembly of the shaft and stem cup. Further, if the two separate pieces are not carefully designed, operation of the assembled tilt valve may dislodge the stem shaft from the stem cup.

SUMMARY OF THE INVENTION

The present invention is intended to provide an aerosol tilt valve of the above general construction, having at least one lateral inlet metering orifice which is easily formed and can be carefully controlled in size. Further, the stem shaft and stem cup are formed by a method which results in an integral stem shaft and stem cup functioning essentially as a one-piece unit having no possible relative operational motion or possibility of disassembly with respect to each other. In the method of the present invention, the stem shaft is first molded from plastic, the hollow shaft being closed at its base and having an annular recess in its exterior wall adjacent the base of the stem shaft. Slightly above the annular recess, at least one precise lateral inlet metering orifice is easily molded at the same time through the side wall of the stem shaft. A plastic stem cup is then molded about the stem shaft. Normally this would be thought to be difficult to accomplish because of the presence of the metering orifice in the aforedescribed annular space between the stem cup, stem shaft and sealing gasket. Obviously, the molding of the stem cup must not result in refilling the inlet metering orifice. However, by utilizing a particular shape of shield placed over the inlet orifice, which shield also surrounds the stem shaft and further acts as a portion of the molding cavity for molding the stem cup and creating the aforementioned annular space, a unique method of obtaining the desired tilt valve stem construction results. When the stem cup is molded about the stem shaft, an annular, inwardly extending, projection of the stem cup is molded into the annular recess in the exterior wall of the stem shaft. When the shield is retracted, and the remainder of the molding cavity for the stem cup is removed, a fully integrated and very strong tilt valve results with the stem cup and stem shaft locked together essentially as one piece by the molding, and a controlled lateral inlet metering orifice extending into the stem shaft in the aforesaid annular space between the stem cup and stem shaft. The stem cup and stem shaft also have no possible relative movement with respect to each other upon operation of the valve, and a precisely controlled tilt valve results. Further, the molding of the stem cup projection into the stem shaft recess avoids swelling of a nylon shaft and cup creating disassembly, since the nylon cup and nylon shaft swell as one piece.

Other features and advantages of the present invention will be apparent from the following description, drawings and claims.

DETAILED DESCRIPTION OF EMBODIMENTS

Figure 1:
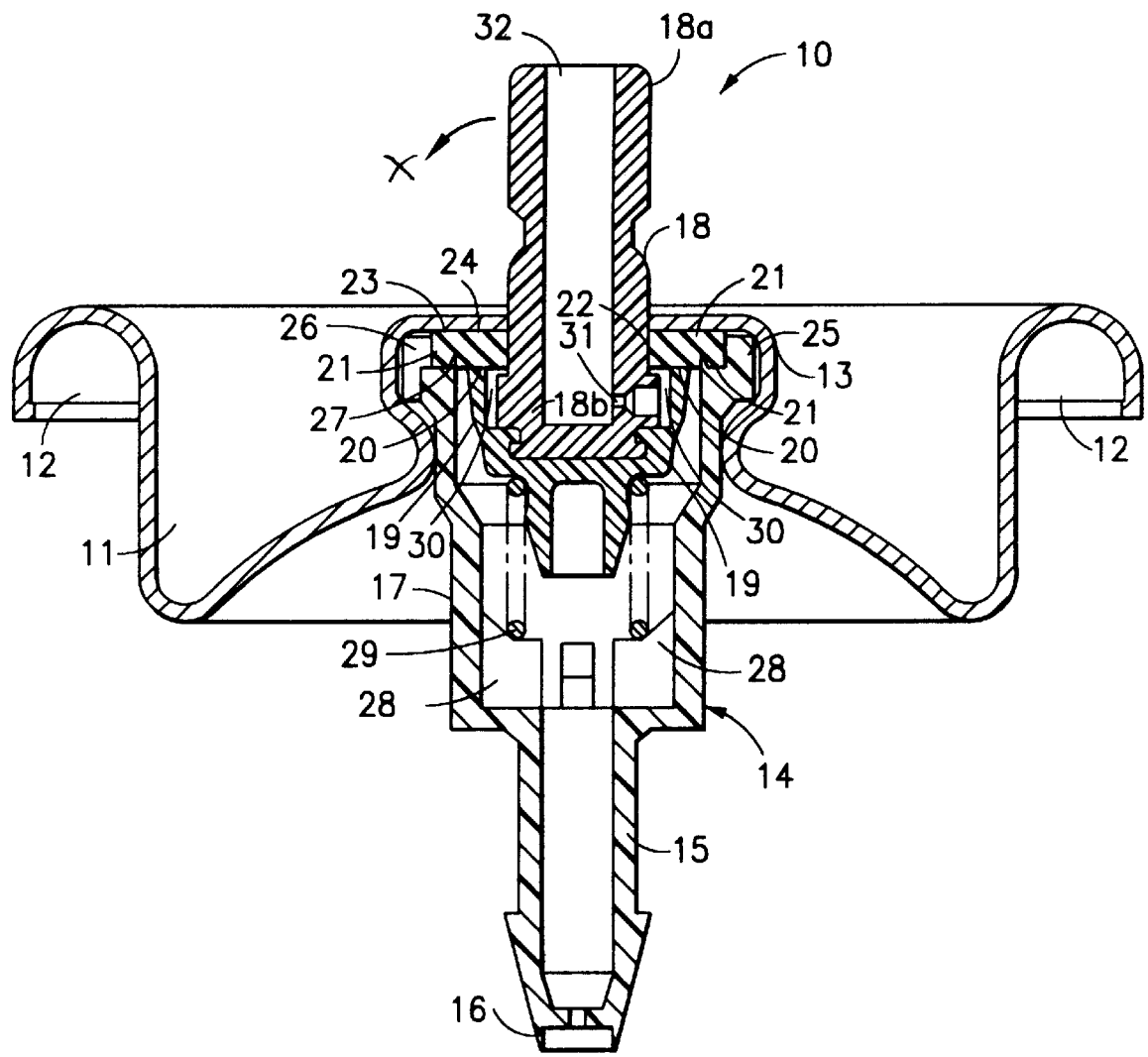
FIG. 1 is a cross-sectional view of the tilt valve of the present invention mounted within a mounting cup for attachment to an aerosol container.
Figure 2:
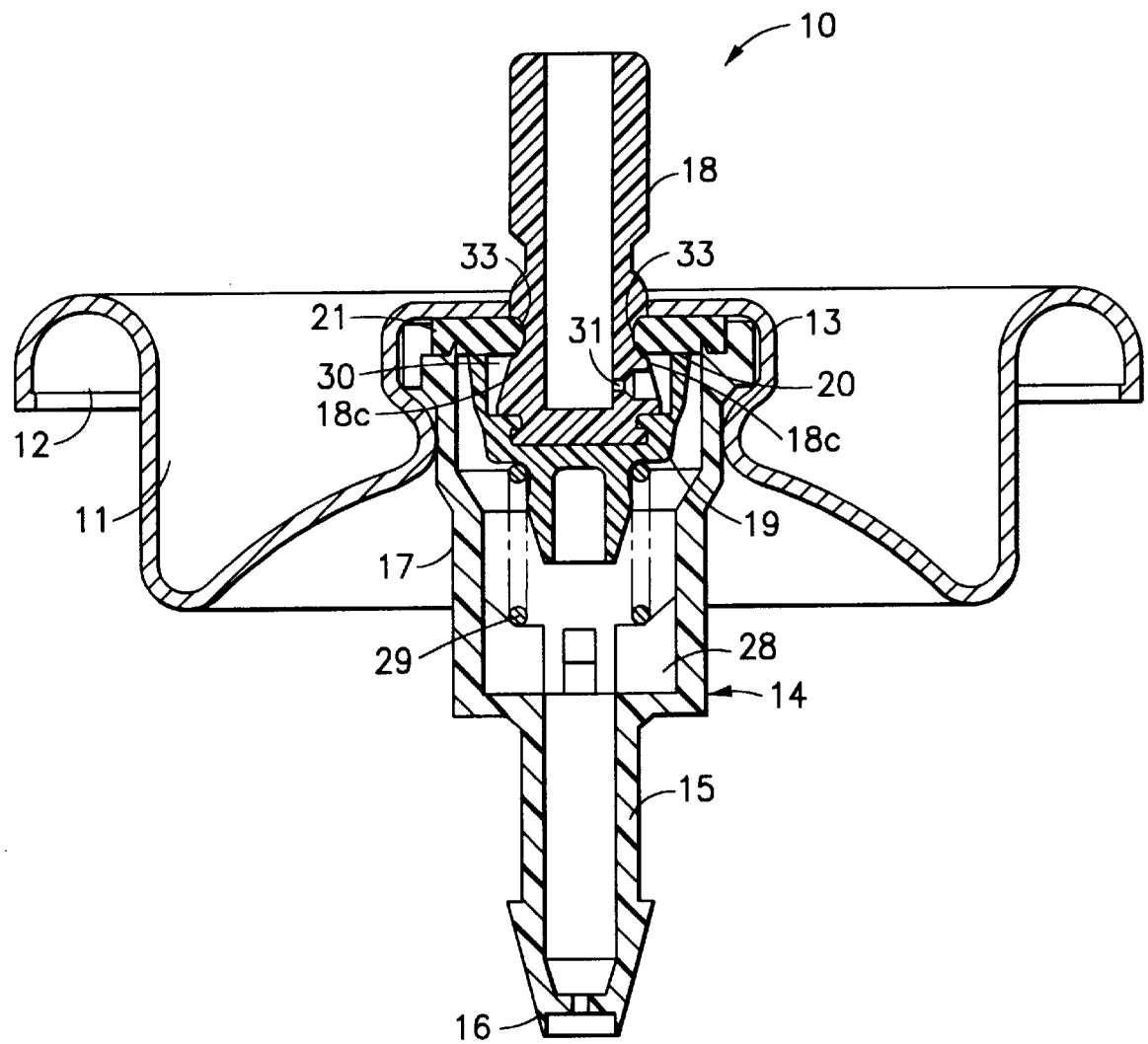
FIG. 2 is a cross-sectional view of an alternative embodiment of the tilt valve of the present invention, likewise mounted within a mounting cup.

Reference is made to FIGS. 1 and 2 which are generally diametrical cross-sectional views through what is generally circular structure in plan view unless otherwise indicated. Like parts in FIGS. 1 and 2 have identical numbers. Tilt valve assembly 10 is illustrated mounted within a conventional metal mounting cup 11. Mounting cup 11 has a circumferential channel 12 which is crimped over the top opening of an aerosol container (not shown) in known fashion. A conventional sealant, for example a sleeve gasket, laminate film, cut gasket or flowed-in gasket, provides sealing between channel 12 and the bead of the container opening upon crimping. The tilt valve assembly is crimped onto the pedestal 13 of mounting cup 11 as shown. The aerosol container is filled with product and propellant by known techniques, the design of the present invention particularly lending itself to pressure filling.

Tilt valve assembly 10 includes valve housing 14 formed for example of nylon. Housing 14 has a lower stem portion 15, to the bottom 16 of which will be attached a conventional dip tube (not shown) extending to near the bottom of the aerosol container containing the product and propellant. Housing 14 also contains a body portion 17. The pedestal 13 of the mounting cup is crimped about housing 14 as shown.

Figure 3:
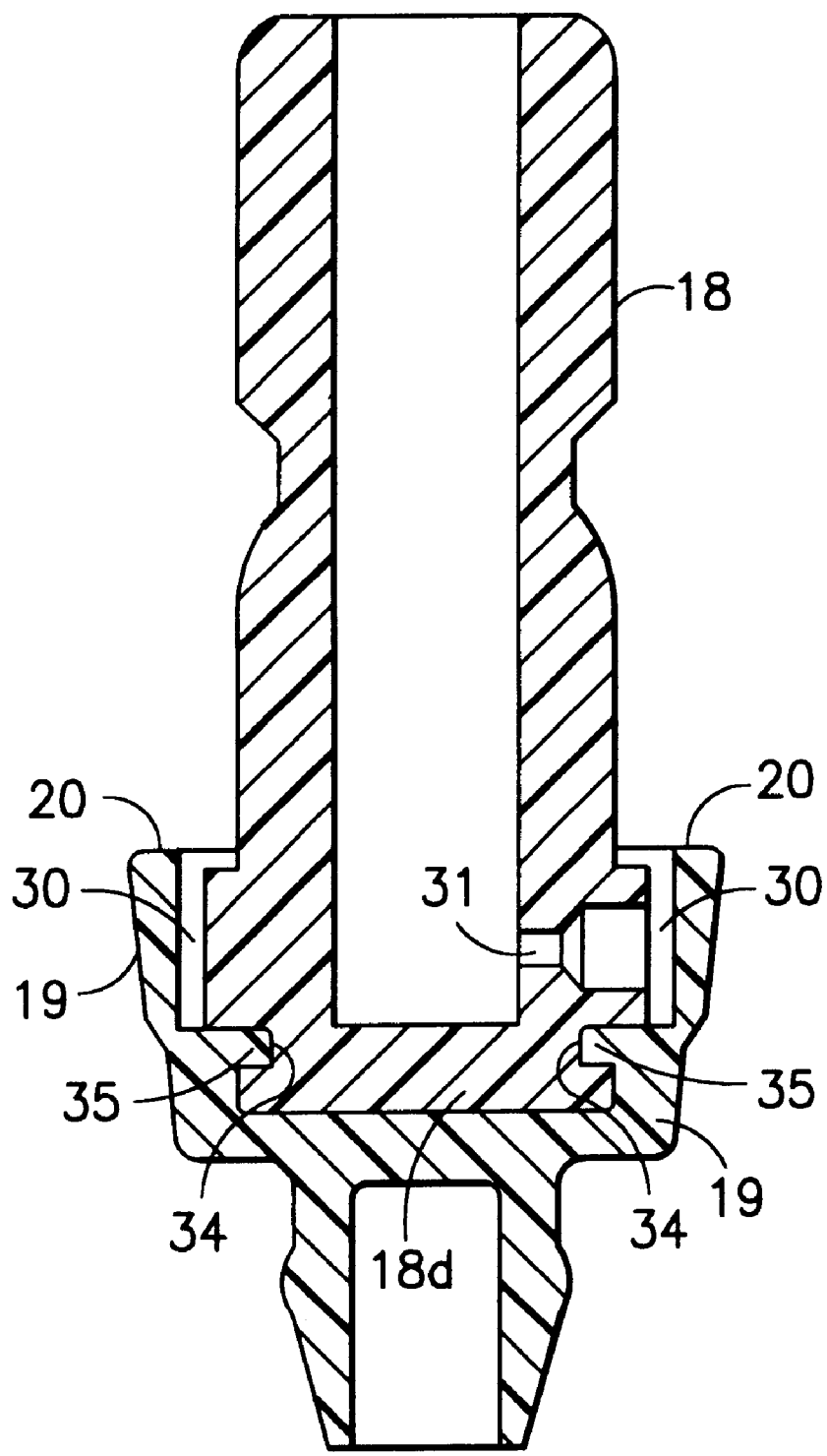
FIG. 3 is an enlarged cross-sectional view of the tilt stem of the tilt valve of the present invention, illustrating both the stem shaft and stem cup in their integrated position with respect to each other.
Figure 4:
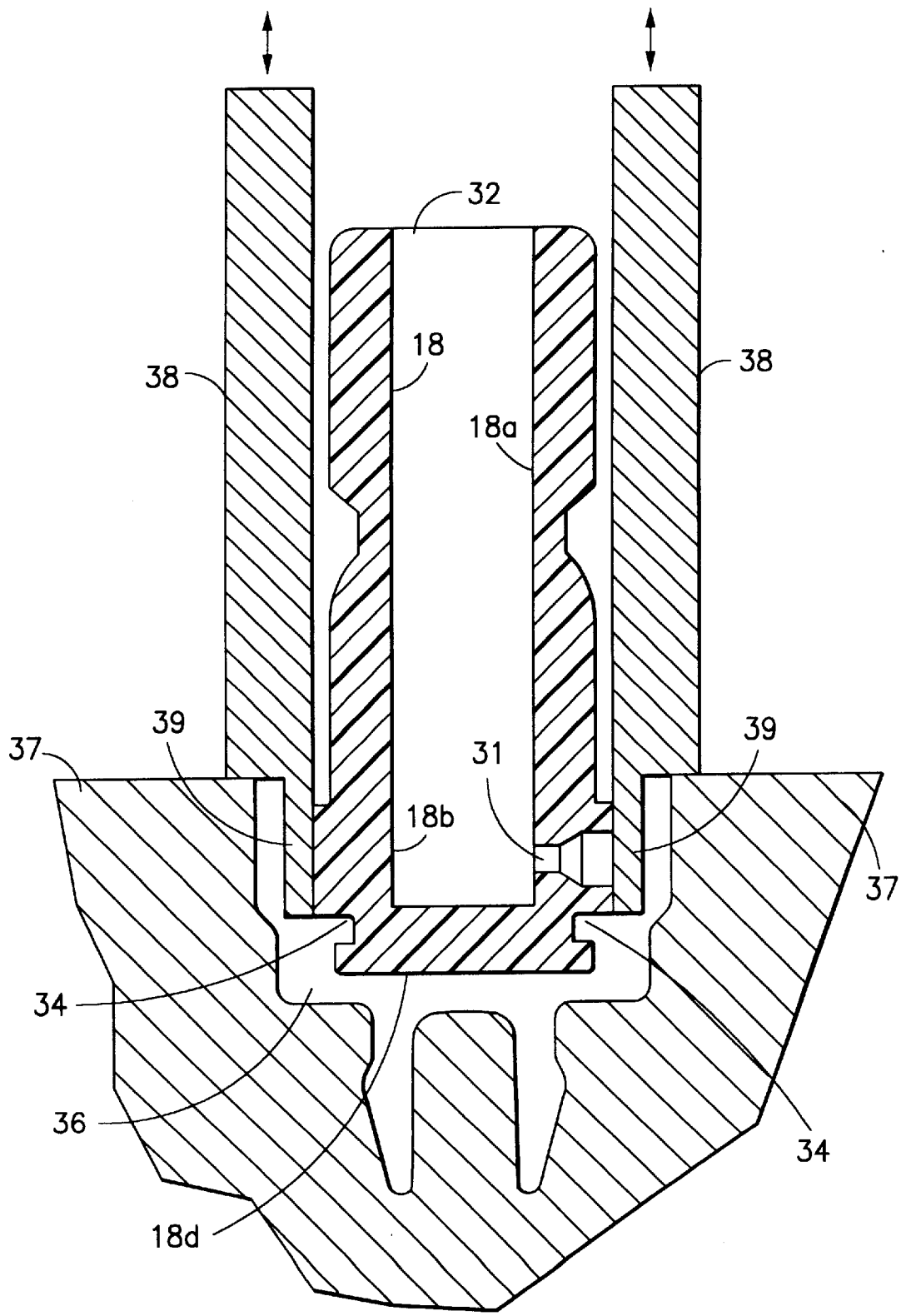
FIG. 4 is a cross-sectional schematic view illustrating the manner in which the tilt stem shaft, stem cup, and metering inlet orifice of FIG. 3 are formed in the present invention.

The tilt valve of the present invention includes a plastic stem shaft 18, and a plastic stem cup 19, the details and formation of which are further described hereafter in relation to FIGS. 3 and 4. Stem shaft 18 and stem cup 19 may be formed of nylon, for example, or possibly acetal. Stem cup 19 has an outer circumferential edge 20 that normally fully engages about its circumference the under surface of a flexible gasket 21 formed for example of butyl rubber. Cylindrical gasket 21 has a central circular opening 22 surrounding and tightly engaging stem shaft 18, and a top surface 23 which engages the under surface 24 of the mounting cup pedestal 13. Stem shaft 18 as shown has an upper portion 18a which extends above the gasket and mounting cup, and a lower portion 18b that extends below the gasket within the stem cup 19.

Housing 14 has a plurality of castellations 25 which extend about its upper outer circumference, spaces 26 being present between the castellations 25 to provide for a known form of pressure filling of the container. Castellations 25 centrally locate and restrain gasket 21. Also present about the upper inner circumference of housing 14 are protrusions 27 which bias the gasket 21 into tight sealing contact with the underside 24 of the mounting cup pedestal. Housing 14 in its body portion 17 also includes a plurality of internal projections 28 which support the lower end of spring 29, the upper end of spring 29 biasing stem cup 19 as shown upwardly toward gasket 21 so that the outer circumferential edge 20 of stem cup 19 normally is in full engagement with gasket 21.

In operation of the tilt valve, the upper end 18a of stem shaft 18 is tilted by finger pressure, for example in the direction of the arrow X shown in FIG. 1. The outer circumferential edge 20 of stem cup 19 then becomes partially disengaged from gasket 21, specifically on the left side of FIG. 1 for the direction of tilt shown. Product from the aerosol container is then forced by action of the propellant up the dip tube (not shown), up the hollow lower stem portion 15 of housing 14, up through the body portion 17 of housing 14 and along the outer side wall of stem cup 19, over the portion of the outer circumferential edge 20 of stem cup 19 that has become disengaged from gasket 21 by the tilting action, and into the annular space 30 between the lower part 18b of the stem shaft and the inner side wall of the stem cup 19. Within annular space 30, the product pressure is equalized and the product flows around to the at least one inlet metering orifice 31 positioned on one side of the lower end 18b of the shaft stem. The product flows through the inlet metering orifice and up the hollow passage 32 in the stem shaft 18 to exit at the top thereof. When the pressure on the tilt valve is released, the resilient gasket 21 and the spring 29 act to close the valve by biasing the entire outer circumferential edge 20 of stem cup 19 back into full contact with gasket 21, thereby closing off any further product flow into the annular space 30.

FIG. 2 is in most respects identical to, and functions the same as, FIG. 1. Further, the flexible gasket 21 extends into a curved annular recess 33 in stem shaft 18 for increased sealing between the gasket 21 and stem shaft 18 if desired.

Turning now to FIGS. 3 and 4, FIG. 3 illustrates the integrated stem shaft 18 and stem cup 19 locked together as one-piece with lateral inlet metering orifice 31 located within annular space 30 between the lower portion 18b of stem shaft 18 and stem cup 19. There of course may be more than one metering orifice 31, for example two or four, similarly positioned within annular space 30 about the circumference of lower portion 18b of stem shaft 18. FIG. 3 is an enlargement of the stem shaft and stem cup illustrated in FIGS. 1 and 2, and the corresponding parts are identically numbered. FIG. 4 schematically illustrates the manner of forming the structure of FIG. 3.

Referring to FIG. 4, stem shaft 18 with upper and lower parts 18a and 18b is initially molded as a single piece in a first conventional injection molding operation. The structure of stem shaft 18 contains an annular recess 34 molded therein and extending about the circumference of the stem shaft. During this initial molding operation, at least one lateral inlet metering orifice 31 of predetermined and controlled dimension is easily molded through the side wall of stem shaft 18 extending from the outer wall through the inner wall into the hollow discharge opening 32 of stem shaft 18.

Following the above operation, the now-formed stem shaft 18 complete with at least one metering orifice 31 is moved to a separate molding station and is centered and supported in a mold 37 in the position shown. Annular shield 38 is then moved downwardly to the position shown, and bottom radially inward annular portion 39 of shield 38 then is in direct sealing contact with the outer side wall of lower portion 18*b* of stem shaft 18 so as to seal off the lateral inlet metering orifice 31 as shown as well as the upper portion 18*a* of stem shaft 18. Annular shield 38, with bottom annular portion 39, mold 37, and the base portion 18*d* of stem shaft 18 with annular recess 34, now define an annular closed mold cavity 36 of the cross-sectional shape shown. It will be noted that this mold cavity shape fully corresponds to the shape of stem cup 19 shown in FIG. 3. Plastic material is then injected into annular mold cavity 36, to mold the stem cup 19 having an annular inwardly directed projection 35 shown in FIG. 3. Annular projection 35 fully fills annular recess 34 in the stem shaft 18. Annular portion 39 of shield 38 not only acts to isolate metering orifice 31 from mold material flowing thereinto, but also acts to form the annular space 30 between the stem shaft 18 and stem cup 19. After the stem cup 19 has been molded, mold 37 and shield 38 with bottom portion 39 are fully withdrawn, leaving the integrated, essentially one-piece, stem shaft 18 and stem cup 19 of FIG. 3.

As can be seen from FIGS. 1–3, the now fully formed stem shaft 18 and stem cup 19 are essentially a one-piece structure with no disassembly or relative operational movement possible therebetween. The stem shaft and stem cup are integrated into a single strong construction, and any swelling of the nylon shaft and cup will not create disassembly. Likewise, the lateral inlet metering orifice 31 of precise dimension is located within the annular space 30 formed between the stem shaft and stem cup. When assembled as shown in FIG. 1, an economical and improved tilt valve results.

It will be appreciated by persons skilled in the art that variations and/or modifications may be made to the present invention without departing from the spirit and scope of the invention. The present embodiments are, therefore, to be considered as illustrative and not restrictive. It should also be understood that such terms as "upper", "lower", "inner", "outer", and corresponding similar positional terms as used in the specification are intended in relation to the positioning shown in FIGS. 1–4, and are not otherwise intended to be restrictive.

What is claimed is:

1. A method of forming an integrated aerosol tilt valve stem having a stem shaft and a stem cup, comprising injection molding a stem shaft including molding an annular recess in the outer wall of the stem shaft adjacent one end of the stem shaft, molding a hollow discharge channel in the stem shaft, and molding at least one lateral inlet metering orifice through the side wall of the stem shaft at a position adjacent the annular recess; inserting the molded stem shaft into a mold defining an open cavity having cavity walls generally spaced from the stem shaft; positioning an annular shield around the stem shaft such that a lower portion of the inner wall of the shield blocks off the at least one inlet metering orifice, and a lower portion of the outer wall of the shield, together with the cavity walls, define a closed mold cavity having the shape of the stem cup to be formed; injecting molding material into the closed cavity to form the stem cup including molding an annular projection on the stem cup extending into the annular recess on the shaft stem; and removing the shield and mold, thereby resulting in an integrated stem cup and stem shaft.

2. The invention of claim 1, wherein the lower portion of the annular shield defines, when removed following molding of the stem cup, an annular space between the inner surface of the stem cup and the outer surface of the stem shaft, said at least one lateral inlet metering orifice in the integrated stem cup and stem shaft being positioned to communicate between the annular space and the stem shaft hollow discharge channel.

3. The invention of claim 2, further including inserting the integrated stem shaft and stem cup into a valve housing having means for biasing the stem cup and stem shaft in an upward direction; positioning a sealing gasket around the stem shaft and on top of the stem cup; and attaching the housing to an aerosol valve mounting cup.

* * * * *